United States Patent [19]

Frembgen

[11] Patent Number: 5,714,054

[45] Date of Patent: Feb. 3, 1998

[54] PROCESS FOR CLEANING THE ELECTROLYTE OF AN ELECTROCHEMICAL MACHINING PROCESS

[76] Inventor: Fritz-Herbert Frembgen, Erfurter Strasse 31, D-87700 Memmingen, Germany

[21] Appl. No.: 705,769

[22] Filed: Aug. 30, 1996

[30] Foreign Application Priority Data

Sep. 15, 1995 [DE] Germany ............ 195 34 277.1

[51] Int. Cl.$^6$ ............................................. B23H 3/10
[52] U.S. Cl. .................................................... 205/673
[58] Field of Search ................... 205/673, 644, 205/670; 204/238

[56] References Cited

U.S. PATENT DOCUMENTS

| | | | |
|---|---|---|---|
| 3,239,438 | 3/1966 | Voorhees | 205/673 |
| 3,255,097 | 6/1966 | Williams | 205/670 |
| 4,859,324 | 8/1989 | Levy et al. | 204/238 X |
| 5,122,242 | 6/1992 | Slysh | 205/644 |
| 5,322,599 | 6/1994 | Peters | 205/644 |

*Primary Examiner*—Donald R. Valentine
*Attorney, Agent, or Firm*—Notaro & Michalos P.C.

[57] ABSTRACT

The treatment of an electrolyte volume arriving from an electrochemical machining process and contaminated with hydroxide sludge is performed in a treatment basin (18) such that the contaminated electrolyte volume is supplied virtually horizontally to the surface of the clear electrolyte storage volume (30) contained in said treatment basin (18), and from this surface (28) electrolyte liquid is pumped away via one or several extraction points (32) for supply to a chamber filter press or centrifuge from whence the cleaned electrolyte is fed back into the treatment basin (18). The extraction of cleaned electrolyte from the treatment basin (18) takes place at a clearance distance from the bottom of said treatment basin (18), in the lower half of the basin or in the center third of the basin (18) height and is pumped from the extraction point there to the electrochemical machining device (10). The electrolyte volume extracted from the liquid surface (28) of the electrolyte storage volume (30) contained in the treatment basin (18) is more heavily enriched with hydroxide sludge than would be the case following mixing with said electrolyte storage volume (30). In order to remove the hydroxide sludge, it is sufficient to extract a relatively small volume of electrolyte liquid per unit time. The chamber filter press or the centrifuge can thus be of smaller dimensions. The electrolyte (30) in the treatment basin (18) can be kept effectively clear. The treatment basin itself is of particularly simple construction.

20 Claims, 2 Drawing Sheets

PROCESS FOR CLEANING THE ELECTROLYTE OF AN ELECTROCHEMICAL MACHINING PROCESS

FIELD AND BACKGROUND OF THE INVENTION

The invention concerns a process for cleaning the machining liquid used in an electrical-erosion metal-machining process, in particular the electrolyte liquid of an electrochemical machining (ECM) process, in which hydroxide sludge occurs which flows together with a just used electrolyte volume into a treatment basin or tank containing an electrolyte storage volume, from which basin a mixture of electrolyte and sludge is extracted from a zone of high sludge concentration and is separated in a chamber filter press or a centrifuge, from which the cleaned electrolyte is returned to the machining process circuit.

Such a cleaning process is known from DE 4005251. This proposes the division of the treatment basin into a chamber, namely a collecting chamber, a settling chamber and an extraction chamber. The contaminated electrolyte passes into the receiving chamber and from there, possibly via an interposed stabilising chamber, from a point close to the bottom into the settling chamber. As the hydroxide sludge is slightly heavier than the electrolyte, the sludge is expected to settle onto the bottom of the settling chamber, and is extracted from there from time to time for treatment in the chamber filter press. Extraction of the cleaned electrolyte is performed close to the liquid surface of the extraction chamber. The known process has proven successful, but requires a sophisticated multi-chamber treatment basin with necessarily large electrolyte storage volumes, because a substantial residence time of the contaminated electrolyte is necessary in order to allow the sludge particles to settle. The extraction pumping operation performed on the hydroxide sludge requires a particularly large volume of electrolyte, which in turn necessitates the employment of large-volume filter presses or centrifuges.

Owing to the necessarily long residence time of the electrolyte in the treatment basin, only partial cleaning takes place in the event that the machining device has a high electrolyte requirement, leading to the disadvantage of contamination of the ECM tools and, resulting from this, inaccuracy in the forming process.

SUMMARY OF THE INVENTION

The object of the invention is to create a new method, and an apparatus operating on the basis of the ensuing process, in order to accelerate and improve the cleaning effect imparted to the electrolyte in the treatment basin, and to render the associated apparatus simpler and thus more economical and cost-effective.

This objective is achieved according to the invention with the process of the generic type mentioned at the beginning, in that extraction of electrolyte enriched with hydroxide sludge is performed at, or close to, the liquid surface of the treatment basin, and is thus effected so quickly after entry of the just used electrolyte volume into said treatment basin, that the percentage content of the hydroxide sludge in the extraction flow is greater than in the total electrolyte volume present in the treatment basin.

The invention is based on the observation that the sludge particles of the hydroxide produced by electrolysis have a specific gravity which changes with time. Initially, the sludge particles are suspended close to the surface in the electrolyte contained in the treatment basin, and their settling velocity is very low. With time, however, the settling velocity increases. This is possibly due to the fact that gases arising from the electrolysis process are still bonded to the sludge particles, and that these provide for a degree of buoyancy in the treatment basin. The invention utilises this knowledge in that, in contrast to the prior art mentioned at the beginning, no waiting time elapses to allow the majority of the sludge particles to sink down to the bottom, but rather the electrolyte volume just used is extracted as quickly as possible from a point close to the liquid surface, before it mixes with the larger storage volume contained in the treatment basin. The electrolyte volume extracted from the liquid surface exhibits a substantially higher hydroxide sludge concentration than would be present in the total electrolyte mixture in the treatment basin following the lapse of sufficient residence time. This directly results, on the one hand, in a reduction in the size of the requisite chamber filter presses or centrifuges, and on the other hand, in a substantial reduction in the structural dimensions, and also simplification, of the treatment basin. If a suitable low-turbulence supply of the just used electrolyte liquid into the treatment basin is ensured, and an essentially laminar condition of the liquid layers in the treatment basin is largely retained, it can be ensured that the newly arriving, just used contaminated electrolyte liquid can be extracted virtually completely from the surface of the liquid in the treatment basin. However, due consideration must be given to the time factor because only within a time span of approx. three minutes following inflow of the contaminated electrolyte liquid is the settling velocity of the hydroxide particles virtually zero. Provided that the inflowing electrolyte liquid can be completely extracted within this period, the results are optimal. As the residence time increases, a greater degree of electrolyte liquid turbidity occurs in the treatment basin, attributable to the sinking of the sludge as a result of degassification of the sludge particles and/or mixture of the electrolyte liquid which has just been used in the preceding ECM process with the electrolyte storage volume already present in the treatment basin.

In contrast to the prior art, the cleaned electrolyte is taken from the treatment basin not from a position close to the liquid surface, but rather from the lower half of the treatment basin, and it has been found that the extracted electrolyte is free of suspended particles and exhibits an absolutely clear appearance. The advantages which arise out of this are a reduction in contamination of the ECM tools, with the consequence of greater precision in the forming of the workpieces, an improved surface of the workpieces, and, in the vicinity of the machining areas, a reduction in contamination of the ECM machines, plus longer service life of the electrolyte and, finally, reduced levels of depositing in the piping and containers. The spatial requirement for the treatment basin is substantially less than that of the prior art apparatus, and the associated manufacturing costs are lower.

Investigations have revealed that the electrolyte volume flowing from the ECM process does not necessarily have to be fed directly to the surface of the electrolyte liquid fill in the treatment basin, but heavy turbulence during introduction of the used electrolyte liquid flow should be avoided to the maximum extent possible. With any increase in surface turbulence in the treatment basin, there is a substantial reduction in the sludge concentration in the extracted contaminated liquid flow.

If the just used electrolyte volume with the sludge particles contained therein is introduced into the treatment basin, preferably close to the surface, with a minimum of turbulence, the extraction point can be arranged adjacent to the inflow point and downstream of the entering electrolyte flow. As a result, the dimensions of the treatment basin can be kept small, and mechanical guide plates can be arranged in the treatment basin, preferably close to the liquid surface, e.g. as floating baffles, which guide the just used electrolyte flow without any loss to the extraction point.

Provided that the above-mentioned criteria are precisely adhered to, the electrolyte storage volume present in the treatment basin remains unclouded, with the exception of a thin layer close to the liquid surface, so that extraction of sludge-free electrolyte liquid can take place at any required level below this turbid suspension layer. For safety reasons, and also due to the ratio of the electrolyte storage volume present in the treatment basin to the used electrolyte volume inflow rate per unit time, extraction of the cleaned electrolyte should, however, not be performed in the upper third of the liquid fill in the treatment basin. Similarly, extraction in the direct vicinity of the bottom of the treatment basin would not be recommendable because, should the cleaning process be disrupted, sludge particles could accumulate there. Ideally, therefore, the extraction point should be located in the lower half of the treatment basin, but with a safe clearance from the treatment basin bottom, or in the center third of the treatment basin height.

The contaminated electrolyte flow arriving from the ECM process is preferably ducted by a hose to a slightly downward-sloping distribution plate, in order to distribute the electrolyte flow uniformly over a larger width of the treatment basin. This inflow arrangement generally produces sufficient flow velocity of the arriving electrolyte volume in the surface zone of the more static resident liquid. In the case of lower flow rates per unit time and/or large-dimensioned treatment basins, it may be advantageous, however, to impart an additional surface current. Slowly rotating transfer rollers combined with guide plates inside the treatment basin are suitable for this purpose, as are compressed air jet systems which produce a moving air curtain along the surface of the liquid fill in the direction of the extraction point. Such compressed air blowing systems at the liquid surface can, according to the invention, also be employed if, where there is an elevated volume of electrolyte requiring cleaning, such volumes cannot be completely pumped off at the main extraction point. The remaining electrolyte flow or several remaining electrolyte flows can then be directed by the blowing system to auxiliary extraction points where likewise contaminated electrolyte layers close to the surface can be pumped away.

BRIEF DESCRIPTION OF THE DRAWINGS

The invention is described in greater detail on the basis of the drawing illustrating an embodiment, with FIG. 1 showing a schematic side view through an apparatus designed to perform the process according to the invention, and FIG. 2 showing a diagram illustrating the change in the settling portion of the hydroxide sludge over time.

DESCRIPTION OF THE PREFERRED EMBODIMENTS

Figure 1:
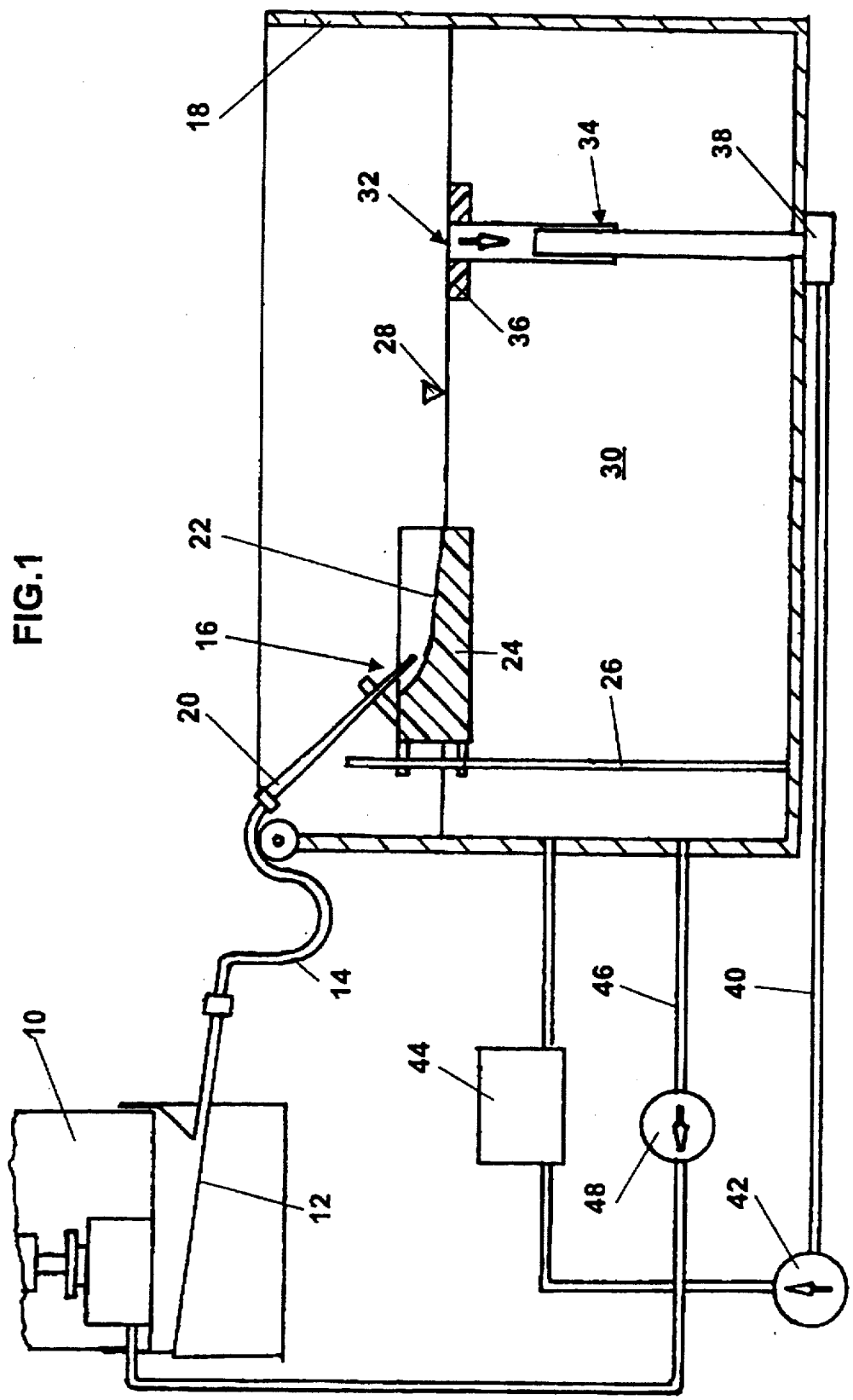

An electrochemical machining device 10 has a collecting pan 12 for electrolyte liquid which has just been used for the ECM process, which liquid is mixed with hydroxide sludge particles. A connecting hose 14 connects the collecting pan 12 to a supply device 16 located inside a treatment basin 18. The supply device 16 exhibits a sloping ramp 20 which diverges in width in the downward direction and ends at a flow bed 22 designed in the form of a floating body 24. The flow bed 22 likewise preferably diverges in the outflow direction, covering at the outflow end a substantial portion of the width of the treatment basin 18. The floating body 24 is mounted on a vertical rod arrangement 26 to facilitate height adjustment, and itself serves to support the ramp 20. The floating body 24 is designed with sufficient buoyancy to ensure that the outflow end of the flow bed, when in operation, i.e. when electrolyte liquid is flowing over the flow bed 22, lies at least approximately flush with the liquid level 28 of the electrolyte storage volume 30 present in the treatment basin 18.

Thanks to the increase in width of the flow bed 22, the electrolyte liquid contaminated with sludge particles enters the treatment basin 18 in the form of a shallow layer and floats so to speak on the surface of the clear electrolyte storage volume 30 contained in the treatment basin 18. Owing to the inflow action, a surface current is imparted inside the treatment basin 18 moving from left to right, and at a distance from the floating body 24 is located in the main flow direction an extraction pipe 32 which, in the embodiment, is designed as a so-called skimmer comprising a telescopic tube 34, the upper section of which is fixed in a float 36 which keeps the top opening of the telescopic tube 34 at the level 28 of the electrolyte storage volume 30. The fixed portion of the telescopic tube 34 opens at the bottom into a header 38, connected to which is a pipe 40 leading to a pump 42 and a chamber filter press 44, which removes sludge particles from the electrolyte liquid in the usual manner so that the cleaned electrolyte liquid can be returned to the treatment basin 18.

Between the floating body 24 and the extraction point 32 are arranged converging guide plates, not illustrated, which float on the electrolyte storage volume 30, and serve to direct the sludge-containing electrolyte layer free of turbulence over the distance from the flow bed 22 to the extraction point 32.

Depending on the size of the treatment basin 18 and the flow rate per unit time of the incoming sludge-laden electrolyte, it may be necessary to arrange several extraction points 32 in a row transverse to the direction of the surface flow, and it may also be advantageous to provide two such rows of extraction points 32, one behind the other, with the extraction points of one row lying in a staggered arrangement in relation to those of the other row.

Opening into the bottom third of the treatment basin 18 at a certain clearance from the bottom is an extraction pipe 46 with a pump 48 which extracts the sludge-free, clear electrolyte liquid from the treatment basin 18 and supplies it to the ECM device.

The electrolyte liquid just used in the completed ECM process and arriving from the machining device 10 contains hydroxide sludge, the specific gravity of which—as it comes out of the chamber filter press 44—approximates to that of the electrolyte. However, the sludge is mixed with oils or greases from the ECM workpieces, and attached to the sludge particles are hydrogen and oxygen molecules which emanate from the electrolysis process of the machining operation. These oil, grease and gas components become detached with increasing residence time from the hydroxide particles so that the specific gravity of the latter increases with time.

Figure 2:
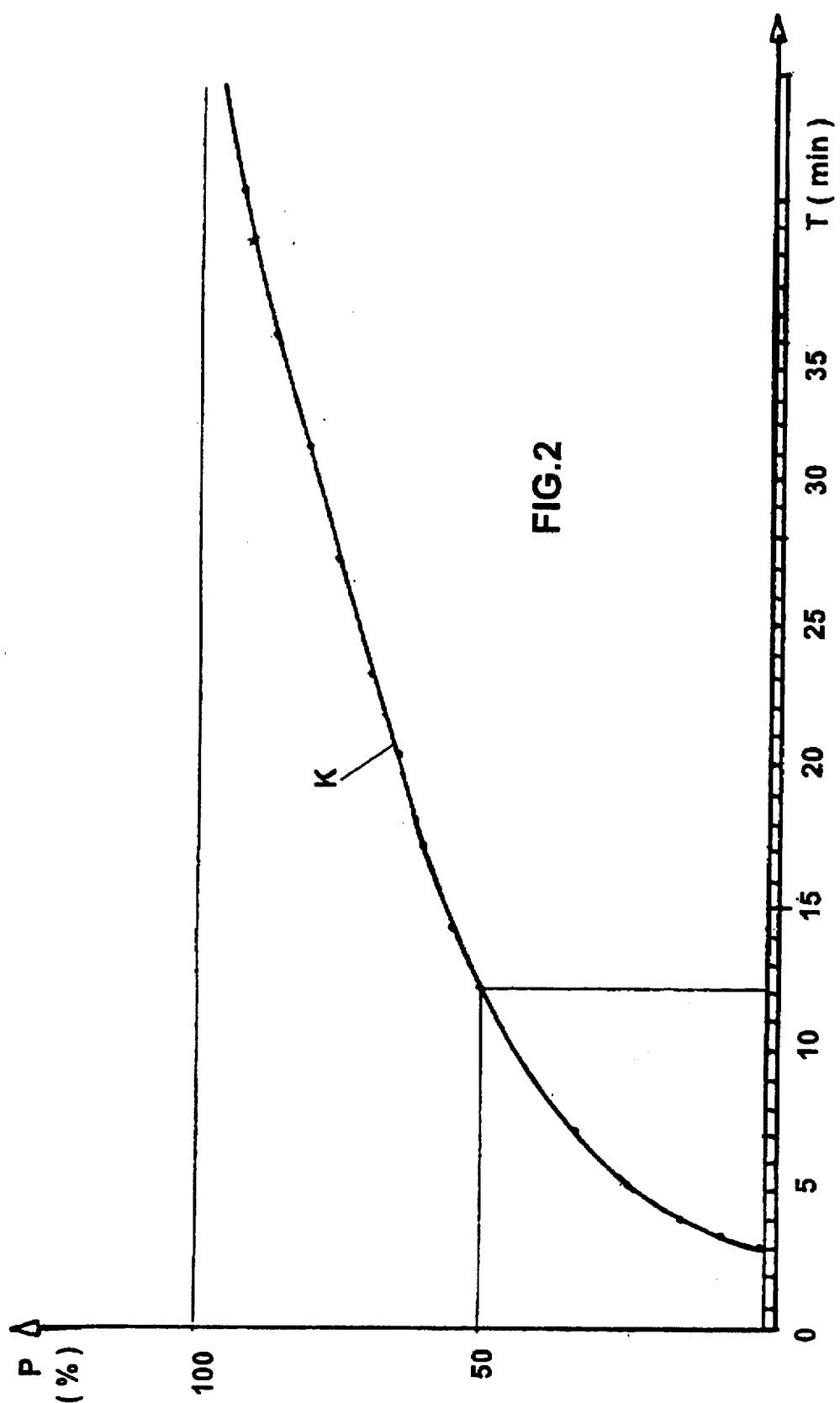

As can be appreciated from the diagram according to FIG. 2, with sufficiently turbulence-free supply of the used electrolyte to the treatment basin 18, the settling velocity of the sludge particles is virtually zero during the first three minutes. The percentage of the settling sludge particles P increases with time T along curve K in accordance with an approximately exponential function. The points of curve K have been determined for turbulence-free inflow of the electrolyte laden with sludge particles. It is apparent that, after twelve minutes' residence time of the used electrolyte solution which has entered the treatment basin 18 from the preceding ECM process, approx. 50% of the sludge particles have precipitated out and sunk to the basin bottom. After somewhat more than 40 minutes residence time, the proportion of sludge which has precipitated from the used electrolyte amounts to virtually 100%. If, therefore, the used electrolyte is pumped off at the surface of the basin contents during the first three minutes from inflow into the basin, all the sludge particles can be removed from the treatment basis 18 without the slightest degree of clouding of the basin contents below the contaminated surface layer. This is, however, subject to the prerequisite that turbulences are avoided in this surface layer. If, for example, the electrolyte storage volume 30 is heavily agitated by a stirring mechanism, so that this affects the sludge-containing surface layer, the tendency for the sludge particles to sink is substantially accelerated. The comparative curve then lies above curve K according to FIG. 2, and the proportion of sludge particles precipitating from the surface layer is almost doubled at low time values. Thus the value of 50% volume precipitation is reached after just approx. seven minutes residence time in the basin 18.

With increasing residence time of the used electrolyte in basin 18, an increased volume of previously cleaned electrolyte which has become turbid has to be included in the extraction flow if the sludge particles are to be completely removed. The percentage of used electrolyte volume in the extraction volume decreases accordingly. This portion should, however, be kept as high as possible, with 40% being regarded as a minimum value.

Although reference has been made in the above to chamber filter presses and centrifuges, it should be regarded as self-evident that equivalent other filtration or separation means, e.g. sedimentation apparatus, may be used equally well in this process without exceeding the scope of this patent.

The process according to the invention may be used not just for cleaning the electrolyte of electrochemical machining processes but also, for example, for cleaning the machining liquid employed in electric discharge machining (EDM, electroerosion).

I claim:

1. A process for cleaning the machining liquid of an electrical-erosion metal-machining process, and in particular the electrolyte liquid of an electrochemical machining process, the cleaning process comprising:

directing a flow of hydroxide sludge together with a just used electrolyte volume into a treatment basin containing an electrolyte storage volume;

extracting a mixture of electrolyte enriched with hydroxide sludge from adjacent the liquid level surface of the treatment basin at a zone of high sludge concentration in an extraction flow sufficiently soon after entry of the just used electrolyte volume into the treatment basin to ensure that the percentage of hydroxide sludge in the extraction flow is at least about 40%, and the percentage of hydroxide sludge in the extraction flow is greater than in the total electrolyte volume in the treatment basin;

separating said mixture with one of a centrifuge and a chamber filter press; and returning the cleaned electrolyte to the process circuit.

2. A process according to claim 1, wherein the used electrolyte volume contaminated with hydroxide sludge is directed into the treatment basin at a point close to the liquid level surface of the electrolyte storage volume.

3. A process according to claim 1, wherein the used electrolyte volume contaminated with hydroxide sludge is directed with minimum turbulence into the treatment basin.

4. A process according to claim 1, wherein the electrolyte volume contaminated with hydroxide sludge is directed into and extracted from the same treatment chamber.

5. A process according to claim 4, wherein the extracting is done from at least one extraction point located downstream of where the just used electrolyte volume is directed into the treatment basin.

6. A process according to claim 4, wherein the extracting is done from an extraction point adjacent where the just used electrolyte volume is directed into the treatment basin.

7. A process according to claim 1, wherein at least a portion of 50% of the just used electrolyte volume is extracted from the treatment basin within a maximum residence time of five minutes.

8. A process according to claim 1, wherein directing the electrolyte contaminated with hydroxide sludge further comprises maintaining a flow in the treatment basin at the liquid level surface, whereby the flow has a main direction component running from where the electrolyte is directed into the treatment basin to at least one extraction point.

9. A process according to claim 1, further comprising extracting a low-sludge-containing electrolyte from the lower half of the treatment basin at a clearance distance from the bottom.

10. A process according to claim 1, further comprising extracting a low-sludge-containing electrolyte from a middle third of a height of the treatment basin.

11. A process for cleaning the machining liquid of an electrical-erosion metal-machining process, and in particular the electrolyte liquid of an electrochemical machining process, the cleaning process comprising:

directing a flow of hydroxide sludge together with a just used electrolyte volume into a treatment basin containing an electrolyte storage volume;

extracting at least 30% of a mixture of the electrolyte enriched with hydroxide sludge within a period of less than ten minutes after entry of the just used electrolyte volume into the treatment basin from adjacent the liquid level surface of the treatment basin at a zone of high sludge concentration in an extraction flow to ensure that the percentage of hydroxide sludge in the extraction flow is greater than in the total electrolyte volume in the treatment basin;

separating said mixture with one of a centrifuge and a chamber filter press; and returning the cleaned electrolyte to the process circuit.

12. A process according to claim 11, wherein the used electrolyte volume contaminated with hydroxide sludge is directed into the treatment basin at a point close to the liquid level surface of the electrolyte storage volume.

13. A process according to claim 11, wherein the used electrolyte volume contaminated with hydroxide sludge is directed with minimum turbulence into the treatment basin.

14. A process according to claim 11, wherein the electrolyte volume contaminated with hydroxide sludge is directed into and extracted from the same treatment chamber.

15. A process according to claim 14, wherein the extracting is done from at least one extraction point located downstream of where the just used electrolyte volume is directed into the treatment basin.

16. A process according to claim 14, wherein the extracting is done from an extraction point adjacent where the just used electrolyte volume is directed into the treatment basin.

17. A process according to claim 11, wherein at least a portion of 50% of the just used electrolyte volume is extracted from the treatment basin within a maximum residence time of five minutes.

18. A process according to claim 11, wherein directing the electrolyte contaminated with hydroxide sludge further comprises maintaining a flow in the treatment basin at the liquid level surface, whereby the flow has a main direction component running from where the electrolyte is directed into the treatment basin to at least one extraction point.

19. A process according to claim 11, further comprising extracting a low-sludge-containing electrolyte from the lower half of the treatment basin at a clearance distance from the bottom.

20. A process according to claim 11, further comprising extracting a low-sludge-containing electrolyte from a middle third of a height of the treatment basin.

* * * * *